E. L. BRACY.
MACHINE FOR PACKING CIGARETTES AND OTHER SIMILAR ARTICLES.
APPLICATION FILED AUG. 2, 1910.

1,069,844.

Patented Aug. 12, 1913.

Witnesses.
W. P. Burk
John A. Percival

Inventor.
Edward Leroy Bracy
By Wm. Wallace White
Att'y

E. L. BRACY.
MACHINE FOR PACKING CIGARETTES AND OTHER SIMILAR ARTICLES.
APPLICATION FILED AUG. 2, 1910.

1,069,844.

Patented Aug. 12, 1913.
9 SHEETS—SHEET 6.

Fig. 7.

E. L. BRACY.
MACHINE FOR PACKING CIGARETTES AND OTHER SIMILAR ARTICLES.
APPLICATION FILED AUG. 2, 1910.

1,069,844.

Patented Aug. 12, 1913

E. L. BRACY.
MACHINE FOR PACKING CIGARETTES AND OTHER SIMILAR ARTICLES.
APPLICATION FILED AUG. 2, 1910.

1,069,844.

Patented Aug. 12, 1913.

E. L. BRACY.
MACHINE FOR PACKING CIGARETTES AND OTHER SIMILAR ARTICLES
APPLICATION FILED AUG. 2, 1910.

1,069,844.

Patented Aug. 12, 1913.
9 SHEETS—SHEET 9.

Witnesses.
W. P. Burr
John A. Percival

Inventor.
Edward Leroy Bracy
By Wm. Wallace White
ATTY

UNITED STATES PATENT OFFICE.

EDWARD LEROY BRACY, OF SCOTLAND NECK, NORTH CAROLINA.

MACHINE FOR PACKING CIGARETTES AND OTHER SIMILAR ARTICLES.

1,069,844.   Specification of Letters Patent.   Patented Aug. 12, 1913.

Application filed August 2, 1910. Serial No. 575,058.

*To all whom it may concern:*

Be it known that I, EDWARD LEROY BRACY, a citizen of the United States of America, residing at Scotland Neck, North Carolina, United States of America, have invented a new and useful Improved Machine for Packing Cigarettes and other Similar Articles, of which the following is a specification.

The object of this invention is to provide a machine for packing cigarettes and other similar articles in twin packets, that is to say in packets in which the paper or other wrapper is so folded as to form two open-ended pockets united at their adjacent open ends by an intervening portion of the wrapper in such a manner that when the two pockets are filled and folded or laid one upon the other, the said intervening portion of the wrapper not only connects the two pockets but at the same time closes the open ends thereof, so as to form two united superposed twin packets.

In order that my said invention may be clearly understood I will proceed to describe the same in connection with the accompanying nine sheets of drawings in which—

Fig. 14 a plan of the same in folded position.

Similar letters and numerals of reference relate to like parts in all the figures of the drawings.

Figure 1:
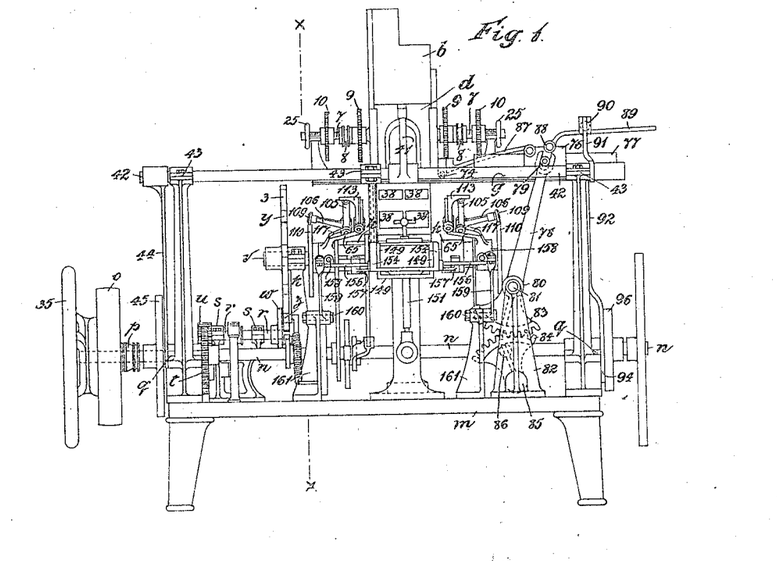
Figure 1 is a front elevation of a machine constructed in accordance with my invention.
Figure 2:
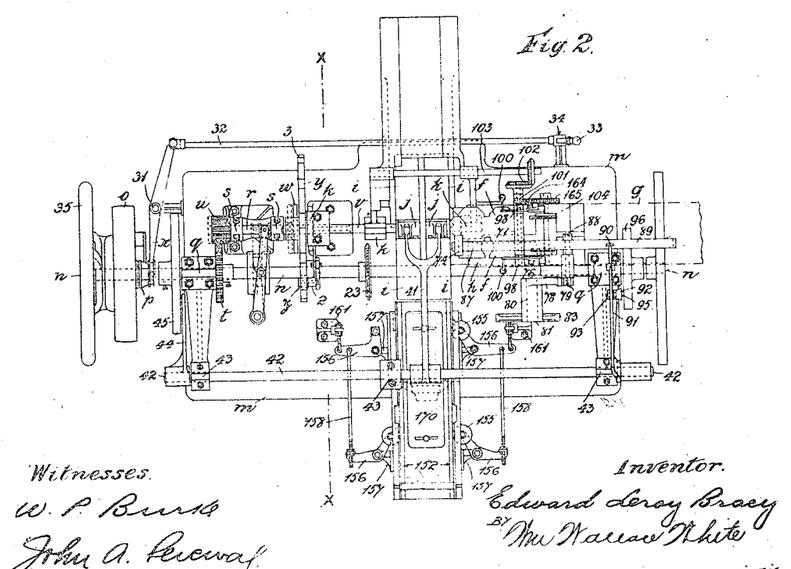
Fig. 2 a plan of Fig. 1.

*General description of machine.*—The cigarettes $a$ (for example) are placed by hand or otherwise into two hoppers $b$ and are fed by two rotary feeding or conveying drums $c$ and inclined guideways $d$ into two horizontal feeding chutes $e$ in a manner similar to that described in the specifications of British Letters Patent No. 9831 of 1904 and No. 5479 of 1905 granted to Richard Harvey Wright and myself. The paper wrappers or blanks $f$ are fed by hand or otherwise onto a horizontal pasting table $g$ where they are pasted at certain parts and conveyed one by one onto a sliding plate $h$ by which a wrapper is deposited over that pair of recesses or molds in two intermittently rotating mold wheels $i$ which are at that moment in the uppermost position. These mold wheels are similar to those described in the specifications of British Letters Patent No. 5668 of 1900 granted to Reginald William James as a communication from the aforesaid R. H. Wright and No. 5479 of 1905 granted to the said R. H. Wright and myself. A double plunger $j$ presses the two charges of cigarettes $a$ out of the feeding chutes $e$ first on to the paper wrapper $f$ and then with the said wrapper into the said uppermost recesses of the mold wheels $i$. The further intermittent rotatory movements of the mold wheels $i$ bring the flaps of the paper wrapper opposite suitable folding devices which close the twin packets, and they are then expelled edgewise from the molds into a trough or channel along which they are forced and their gummed flaps are held in place until they dry or set, and the completed twin packets are finally ejected from the trough or channel ready to be packed or otherwise disposed of. The machine is mounted upon a base plate $m$ and the main driving shaft $n$ (carrying the belt driving pulley $o$ and main clutch $p$) runs in suitable bearings $q$ carried thereby. The clutch $p$ is provided with the usual forked lever $x$ fulcrumed at 31 and connected by the link 32 to the hand lever 33 which is fulcrumed at 34 (Fig. 2). The shaft $n$ also carries a hand wheel 35 for turning or adjusting the machine by hand. A countershaft $r$, the bearings $s$ of which are also carried by the base plate $m$, receives its motion from the main shaft $n$ by means of the toothed wheel $t$ and pinion $u$ (Fig. 2). This countershaft $r$ imparts the necessary intermittent rotatory motion to the shaft $v$ of the mold wheels $i$ in any convenient manner as for example by means of a disk $w$ having a crank pin $x$ which periodically engages the radial slots $y$ of the wheel 3 in succession, the wheel 3 being intermittently held stationary in any convenient manner.

Figure 5:
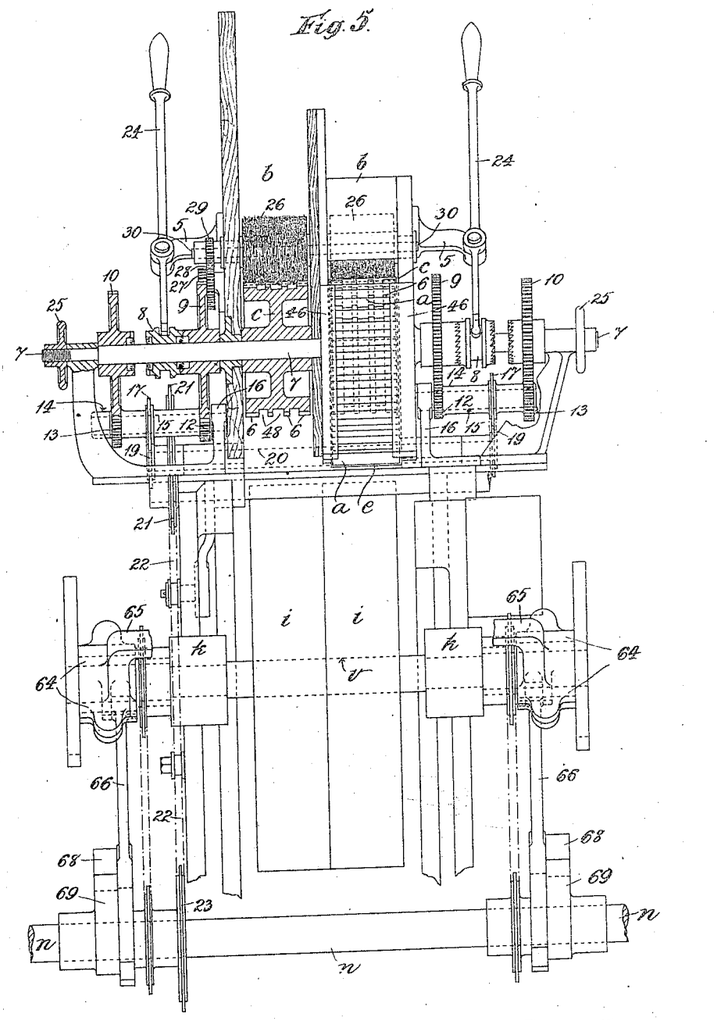
Fig. 5 a front elevation (partly in section) of the cigarette feeding devices.
Figure 6:
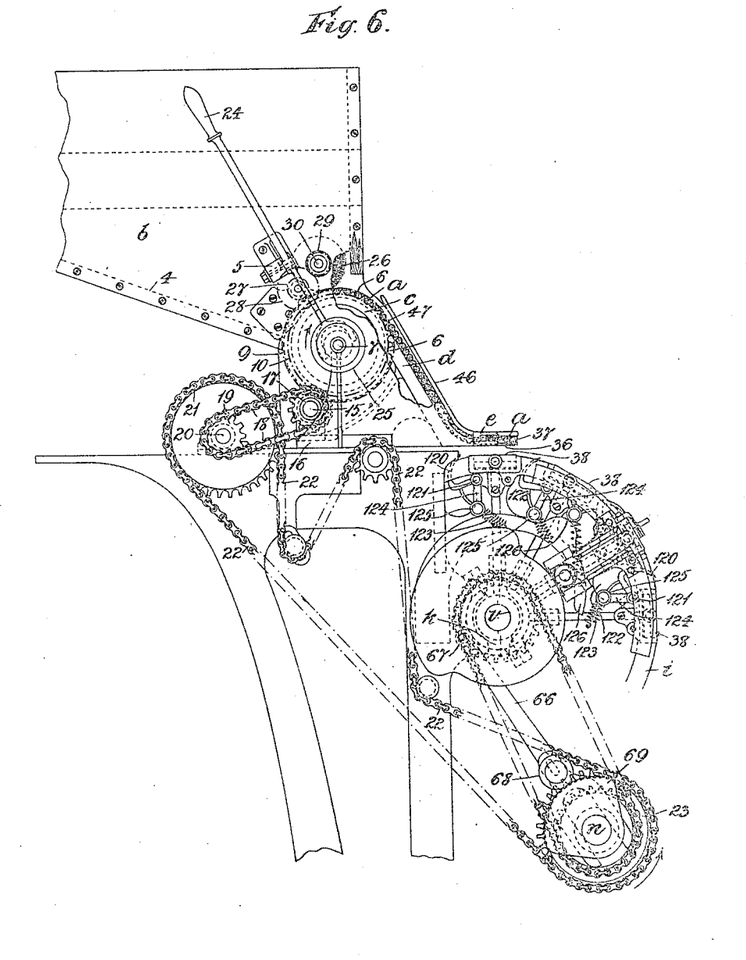
Fig. 6 a side elevation (partly in section) looking from left to right of Fig. 5.

The apparatus by which the predetermined number of cigarettes is introduced into each of the horizontal feeding chutes $e$ is arranged in the manner more especially illustrated in Figs. 5 and 6. $b$ are two hoppers having inclined bottoms 4, in which hoppers the cigarettes $a$ are placed so that they lie crosswise of the hoppers and roll down the inclined bottoms 4 thereof, the distance apart of the sides of each hopper being adapted to the length of the cigarettes $a$. Into the lower part of each of these hoppers enters a portion of the periphery of a feeding and conveying drum $c$ which is also of a width corresponding more or less with the length of the cigarettes. Grooves 6 are formed across the periphery of each of these drums $c$ at convenient distances apart, and of a depth about equal to, or slightly in excess of, the diameter of a cigarette. Each of the drums $c$ is mounted on a separate shaft 7 adapted to rotate in suitable bearings as shown, and receives rototary motion from any convenient part of the machine. But I prefer to drive the drums $c$ by means of the following special arrangements which are illustrated clearly in Figs. 5 and 6. Each of the drums $c$ is keyed upon its separate shaft 7 so that each is driven independently of the other, and each of them is fitted with improved devices by which, in the event of either one of them failing at any time to deliver a sufficient number of cigarettes into its inclined guideway $d$ and feeding chute $e$ at the normal speed, the speed may be temporarily accelerated in order to make up such deficiency. For this purpose a collar or sleeve 8 is provided with slides upon a feather upon the shaft 7 and has a clutch surface on each of its sides as shown in Fig. 5. Other similar clutch surfaces are formed on the sides of the bosses of the two toothed wheels 9 and 10 which turn loosely on the shaft 7 and which engage with the toothed pinions 12 and 13 upon the sleeve 14 which turns loosely upon the stud 15 carried by the bracket 16. The sleeve 14 also carries a sprocket wheel 17 which is driven by means of the chain 18 from another sprocket wheel 19 upon the shaft 20 which latter is in turn driven by means of the sprocket wheel 21 and chain 22 from the sprocket wheel 23 upon the main shaft $n$ of the machine. The toothed wheel 9 and pinion 12 nearest the feed drum $c$ are arranged to rotate the said drum at the normal speed, and for this purpose the collar or sleeve 8 and the wheel 9 are normally in engagement by means of their clutch surfaces as shown in Fig. 5. But if it is required to make up a deficiency in the delivery of cigarettes as before explained, the attendant may, by means of the clutch lever 24 which is fulcrumed to the bracket 5, shift the clutch collar or sleeve 8 out of gear with the wheel 9 and into gear with the wheel 10, by which action the speed of the drum $c$ will be accelerated, the number of teeth in the wheels 9 and 10 and of the pinions 12 and 13 being suitably proportioned for that purpose. In consequence of the increased speed of the shaft 7 and drum $c$, the cigarettes will then be delivered into the inclined guideway $d$ and feeding chute $e$ at a greater speed until the deficiency is made up, when the attendant again shifts the clutch lever 24 and restores the collar or sleeve 8 into its normal position in gear with the wheel 9 which is arranged to rotate at a speed which will as nearly as possible maintain such a supply of cigarettes in a given time as the other parts of the machine are adapted to deal with. A hand wheel 25 is provided on the end of each of the shafts 7 to enable the drums $c$ to be rotated by hand when required, the collar or sleeve 8 being then placed in the central position with both of its clutch surfaces out of gear. As the grooved periphery of each of the drums $c$ passes around in the lower portion of the hopper $b$ a cigarette drops into each groove 6 in the said drum, and in order to insure that each of the said grooves becomes charged with a cigarette, and that the latter lies at the bottom of its groove, a brush 26 or other equivalent yielding body, is mounted in bearings in the sides of the hopper $b$, and is caused to rotate in contact, or nearly so, with the periphery of the drum $c$, and preferably also with the cigarettes $a$ in the hopper $b$. These brushes 26 may be rotated in any suitable manner, for example, by means of the beforementioned toothed wheel 9, the intermediate pinion 27 and wheel 28, and the pinion 29 fixed on the shaft 30 of the brush 26. If desired, however, the gearing may be so arranged that the speed of rotation of the brush 26 shall always be in proportion to that of the drum $c$.

After the portion of each drum $c$ which has passed through the lower part of its hopper $b$ has become charged with a cigarette in each groove 6, the continued rotation of the said drum in the direction of the arrow in Fig. 6 conveys these cigarettes under stationary guide plates 46, and they are then caused to leave the grooves 6 and enter the inclined guide way $d$ which delivers them into the horizontal feeding chute $e$. The removal of the cigarettes $a$ from the grooves 6 in each drum $c$ as the latter rotates is effected by means of one or more fingers or blades 47 attached to and forming an upward prolongation of the bed or bottom of the inclined guideway $d$. The upper ends of those fingers or blades 47 enter circumferential grooves 48 formed in the periphery of each of the drums $c$ and preferably of somewhat greater depth than that of the grooves 6 containing the cigarettes $a$, so that the extremities of the fingers or blades 47 lie below the cigarettes in the grooves 6 (Figs. 5 and 6). Somewhat similar fingers or blades may be fitted for removing the cigarettes $a$ from the bristles of the brush 26. It will now be understood that as each cigarette $a$ in succession comes into contact with the fingers or blades 47 it is lifted out of its groove 6 and then falls down the inclined guideway $d$ by which it is led into the horizontal feeding chute $e$ as before stated. In some cases, as for example when the cigarettes have mouthpieces attached to them, their descent in each of the inclined guideways $d$ may be facilitated by means of a suitably driven endless band (not shown in the drawings) acting against the undersides of the falling cigarettes.

When the cigarettes $a$ enter the horizontal feeding chutes $e$ they are supported therein by their ends only by spring yielding leaves 36 and are fed along the said chutes $e$ against a suitable stop 37. They are then pressed downward by means of the double plunger $j$ on to the paper wrapper $f$ which has already been deposited in place upon the spring yielding bottoms 38 of the two uppermost of the recesses 39 in the mold wheels $i$ in a manner which will be hereinafter described. The spring leaves 36 yield to the pressure of the double plunger $j$, and return to their normal raised position upon the upward stroke of the said plunger.

The double plunger $j$ is pivotally mounted at 40 on one end of the arm 41 the other end of which is mounted upon and moves with the rocking shaft 42 which rotates in bearings 43 and receives movement by means of a second arm 44 also mounted upon it, and having a bowl at its lower end which engages with a pair of edge cams formed upon the wheel 45 upon the shaft $n$. The number of movements of the double plunger $j$ (according to the required number of layers of cigarettes) may be varied according to the shape of the said cams on the cam wheel 45. In cases where it is required that the number of cigarettes in one layer of each charge should differ from that in another layer, a stop operated by a suitable cam device is made to advance periodically and occupy the space equal to one or more cigarettes in each of the feeding chutes $e$ in a manner similar to that described in the specification of British Letters Patent granted to me No. 21625 of 1897.

Figures 12, 13, 14A, 15, 16, 17, 18, 19, 20, 21, 22:
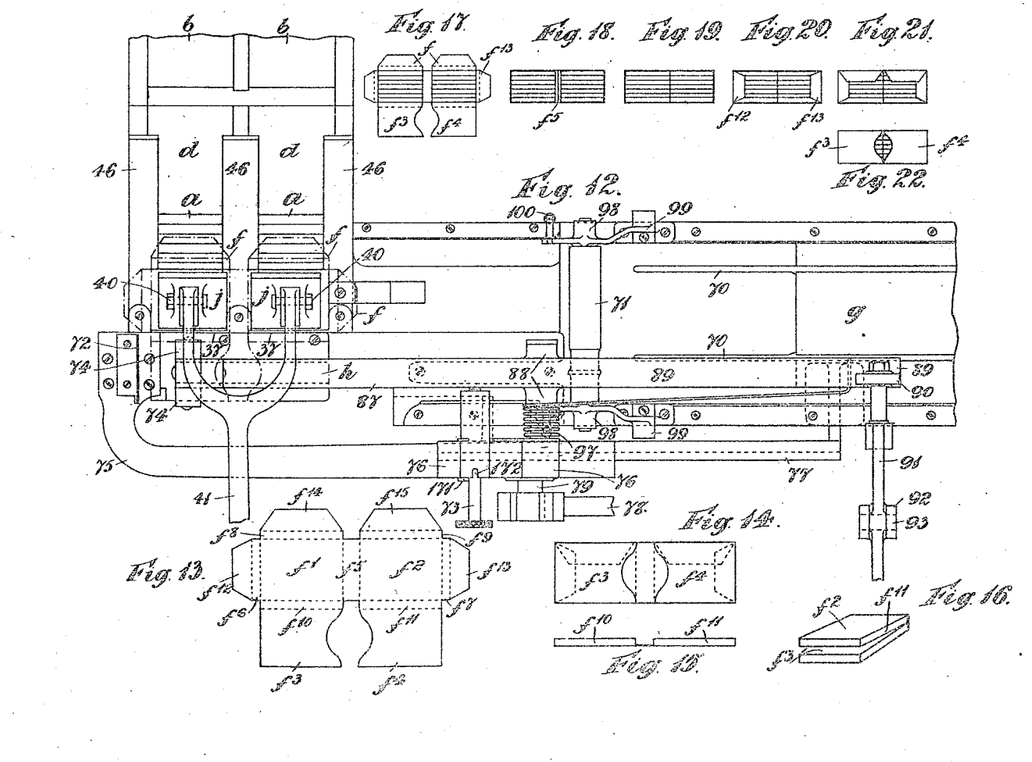
Fig. 12 a similar view to Fig. 11 but with certain of the parts in a different position.
Fig. 13 a plan of the paper wrapper before folding.
Fig. 15 a side or edge view of Fig. 14.
Fig. 16 an isometrical view of the folded twin packet.
Figs. 17 to 22 plan views respectively illustrating the various stages of the folding operation.

The paper wrappers or blanks $f$ are fed, as before stated, by hand or otherwise on to the pasting and conveying table $g$ where they are pasted at the required portions by any suitable pasting devices, and are conveyed one by one by a conveying chain having projections which engage the edge of each paper wrapper or blank through the slots 70 in the table $g$, and carry it forward until the forward edge $f^{12}$ is caught by the feeding rollers 71 which carry it further forward until the leading edge of the forward wide flap $f^3$ comes against the stop 72 which is fixed on to a suitably guided sliding plate $h$ which forms a portion of one side only of the fixed pasting and conveying table $g$. Clamping rollers 74 or other like holding or pressure devices are then lowered so as to hold the wrapper or blank $f$ on to the sliding plate $h$ and while so held, the said plate $h$, the wrapper or blank $f$, and the holding devices 74, are caused to travel together above and transversely across the two mold wheels $i$. During this movement that portion of the wrapper or blank which extends beyond the side of the sliding plate $h$ leaves the table $g$, and at the end of the stroke of the sliding plate $h$ the portions $f^1$ and $f^2$ (Fig. 13) of the said wrapper or blank rest directly beneath the two feeding chutes $e$ and the two faces of the double plunger $j$, and directly above the two uppermost molds in the mold wheels $i$, the connecting band $f^5$ of the wrapper or blank being above the circumferential wire 49, so that upon the descent of the double plunger $j$ as before described, and the retirement of the holding devices 74, the two charges of cigarettes will be pressed on to the wrapper and with the wrapper into the said two uppermost molds, the parts $f^5$, $f^6$, $f^7$, $f^8$, $f^9$, $f^{10}$, and $f^{11}$, of the wrapper now standing within the molds perpendicularly to the parts $f^1$ and $f^2$, and the parts $f^3$, $f^4$, $f^{12}$, $f^{13}$, $f^{14}$, and $f^{15}$, extending beyond the upper edges of the molds.

Figure 4:
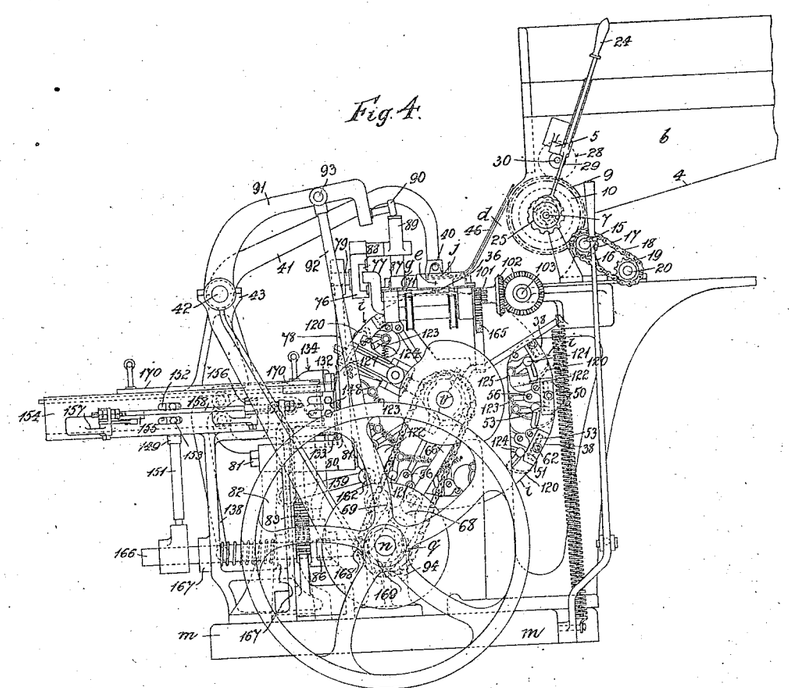
Fig. 4 a side elevation looking from right to left of Figs. 1 and 2.

The sliding plate $h$ is drawn along in its forward and backward strokes by means of the bar 75 the rear end of which is attached to the carriage 76 which runs upon the fixed guide bar 77. Backward and forward motion is imparted to the carriage 76, bar 75, and sliding plate $h$ by means of the arm 78, the forked upper end of which engages with the pin or stud 79 upon the side of the carriage 76, the lower end having a boss 80 carried upon a stud 81 in the bracket 82 (Fig. 4). The boss 80 has a toothed sector arm 83 which gears with a similar toothed sector 84 carried by a stud 85 in the lower part of the bracket 82, the said sector being oscillated by the engagement of the bowl 86 with a projecting cam path on the face of a cam wheel upon the shaft $n$. The clamping devices 74 which hold the wrapper on the sliding plate $h$ are mounted upon one end of a spring blade 87 fulcrumed at 88 to the carriage 76 and having a backward extension 89 upon which runs the roller 90 carried at the end of an arm 91 freely mounted upon the rocking shaft 42.

92 is a rod pin-jointed at 93 to the arm 91 and having a fork 94 at its lower end embracing the shaft $n$ and a bowl 95 which engages with a cam surface on the cam wheel 96 upon the said shaft $n$. The wrapper clamping devices 74 are forced in a downward direction by means of the spring 97 but are raised and lowered at the required periods by the rising or falling of the roller 90 as the extension 89 travels beneath it. The upper bearings 98 of the feeding rollers 7 are pivotally mounted at 99 and are urged in a downward direction by the springs 100 so as to insure proper contact between the rollers 71 and the wrappers or blanks $f$, and the said rollers may be driven by the toothed wheels 101 and the miter wheels 102 from the shaft 103 which may be driven from a shaft $n$ or other suitable part of the machine. The sprocket wheels 104 (Fig. 2) which drive the conveying chains for feeding the paper wrappers $f$ may also receive their motion from the miter wheels 102 through the toothed wheels 101, 164 and 165. The spring blade 87 may be held in the raised position when required by causing the pin 73 to project underneath the same by turning the said pin until the projection 171 thereupon comes opposite to and enters the notch 172 in the carriage 76.

Figure 3:
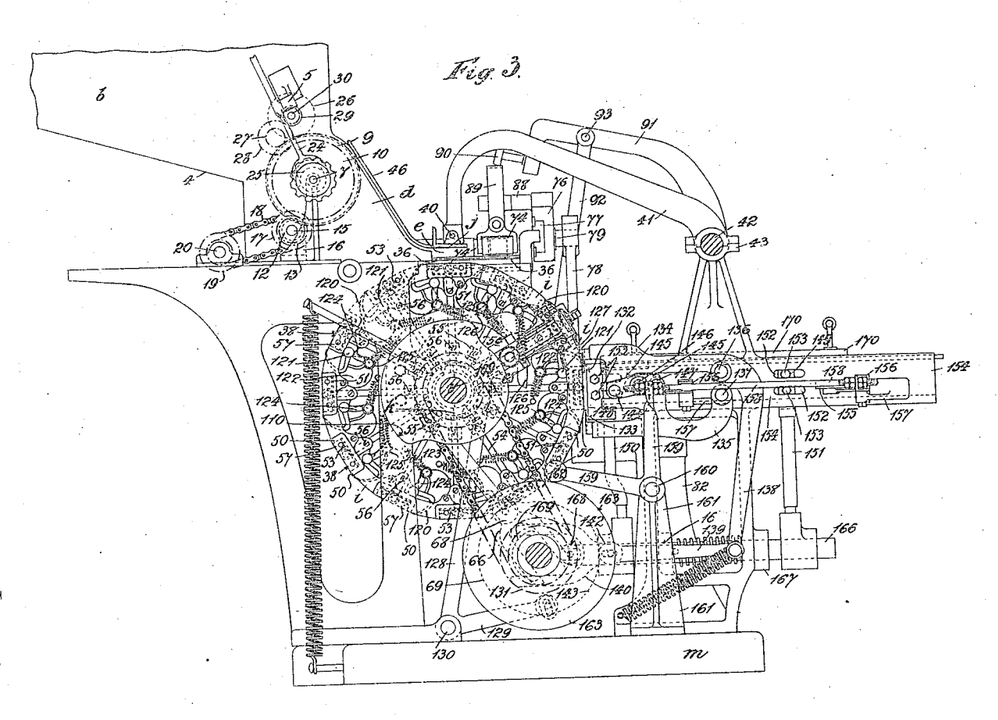
Fig. 3 a transverse section on line X—X of Figs. 1 and 2 looking from left to right of those figures.

The mold wheels $i$ are shown as having twelve molds or recesses but this number may be modified according to circumstances. The wheels $i$ are mounted side by side as shown upon the shaft $v$ which is carried by bearings $k$, the said wheels being connected together by suitable bridge pieces, and between them is mounted the circumferential wire or the like 49 which is suitably supported from the mold wheels between the molds or recesses and stretches across the gap formed by the open inner ends of each pair of molds. Each mold is formed of two fixed sides, 50, a fixed bottom, 51, and one (outer) end 52 formed by a circumferential ring fixed upon the outer sides of the wheels, and having recesses opposite each mold as shown, the other (inner) end being open as before stated. Each mold has a second movable or false bottom 53 held in place by the pressure of friction springs acting upon the side of the supporting and guiding rod 54 which passes through the fixed bottom 51 of the mold and through a guiding eye 55 on the web of the wheel as shown in Figs. 3 and 4. The before mentioned friction springs are contained within holes in the bottom 51 of the mold and in the guiding eye 55 and are held in place in such holes by the screws 56.

Figure 7:
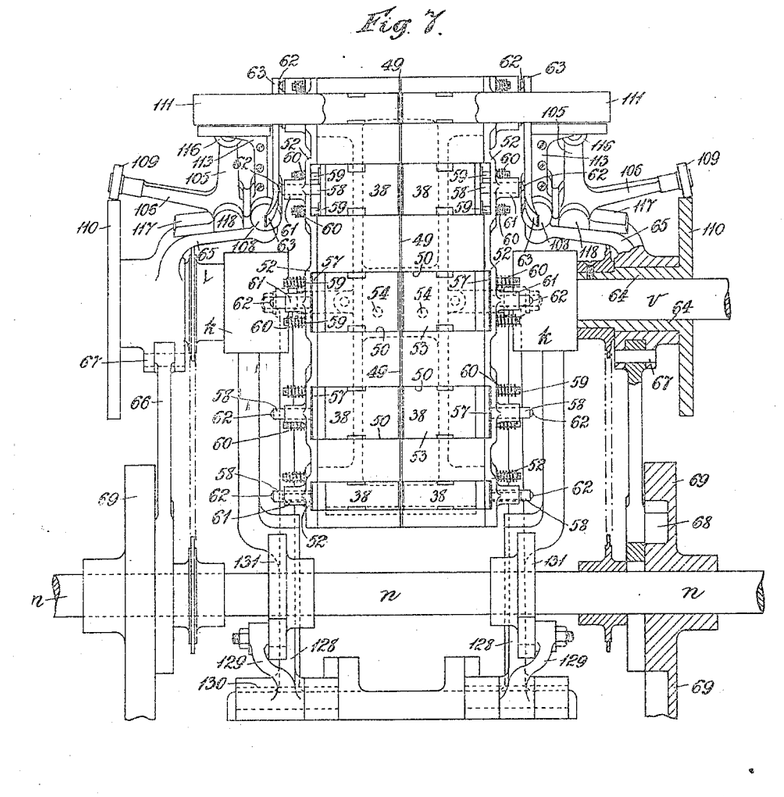
Fig. 7 a partial front elevation (partly in section) of the carrier or mold wheels and parts in connection therewith.
Figure 8:
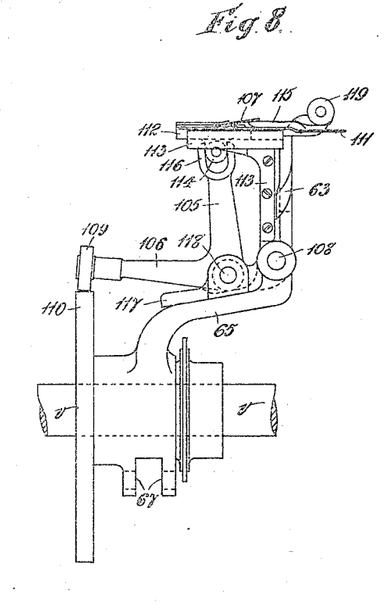
Figs. 8, 9 and 10 detail views of end flap folding mechanism.
Figure 9:
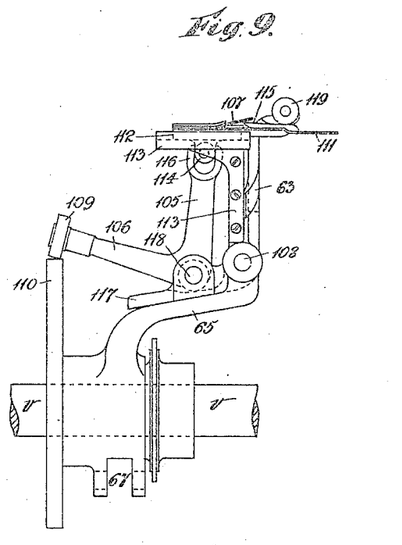
Figure 10:
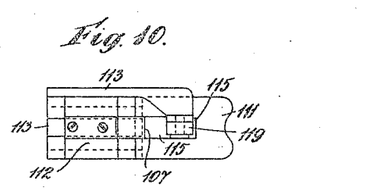
Figure 11:
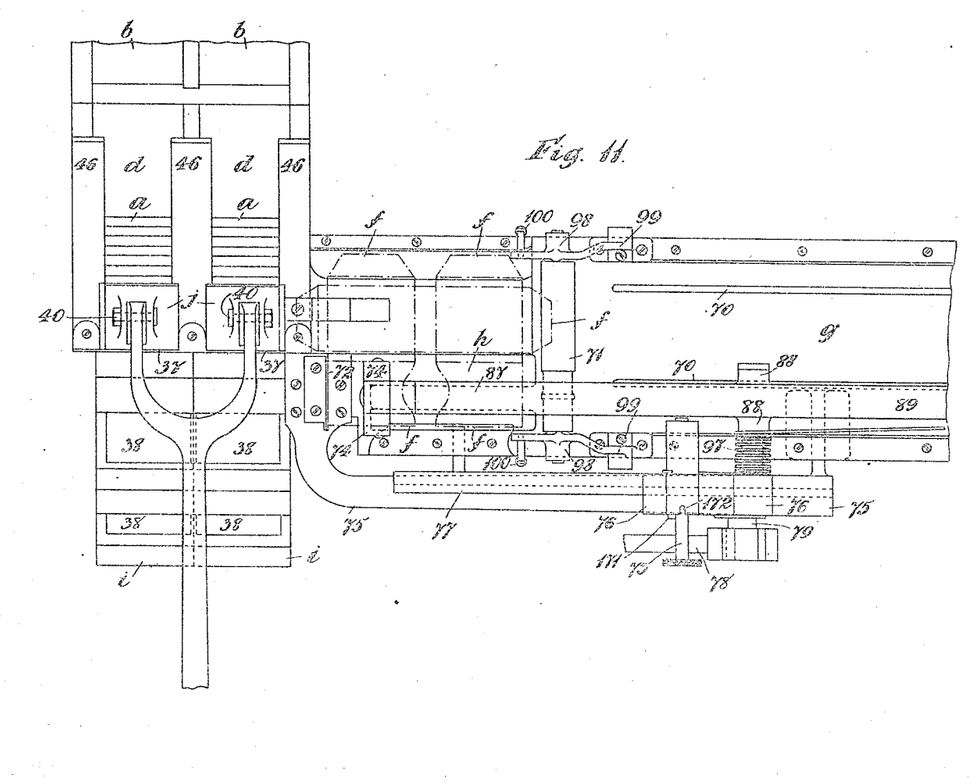
Fig. 11 a partial plan view of wrapper carrier and parts in connection therewith.

Each mold has one second movable or false end 57 which normally lies close against the inner face of the fixed outer end 52 but is adapted to move to a slight extent endwise of the mold. It is guided in this movement by a central pin 58 and two side pins 59, the latter being furnished with springs 60 which draw the false end 57 against the fixed end 52 of the mold. The central pin 58 is guided through the boss 61 on the outer side of the fixed end 52 of the mold, and carries at its outer end a freely moving ball 62 or other like device which during a certain portion of the rotation of the mold wheel $i$ comes into engagement with a segmental wiper plate 63 which causes the false end 57 to be pushed inward along the mold toward the beforementioned strained wire 49. The said segmental wiper plate 63 is supported from and turned loosely upon a sleeve 64 upon the shaft $v$ by arms 65 and rotates a certain distance with the said shaft and then returns into its normal position. This motion is communicated to the arm 65 and wiper plate 63 by the forked rod 66 pin-jointed at its upper end to the boss of the arms 65 at 67, its lower forked end passing over the shaft $n$ and having a bowl 68 which engages with a suitable cam surface on the cam plate 69 keyed upon the said shaft (Fig. 7). Each of the arms 65 also carries a bell crank lever 105, 106, the arm 106 of which is furnished with a bowl 109 on its outer end engaging with the cam plate 110 which is formed in one with the beforementioned sleeve 64 upon the shaft $v$. The other arm 105 of each bell crank lever operates the folding devices which fold the flaps $f^{12}$, $f^{13}$ of the paper wrapper $f$ over on to the cigarettes as they lie in their wrapper in the molds which have been brought opposite the said folder by the partial rotation of the mold wheels $i$, the segmental wiper plates 63 having previously acted upon each of the movable or false ends 57 of the mold by their engagement with the balls 62 and have thereby pressed the two charges of cigarettes in the adjacent molds toward and against one another with the double thickness of the connecting band $f^5$ of the wrapper folded between them over the circumferential wire 49 which lies between them in the crease. In other words the cigarettes are pushed into their final position in the paper wrappers with what will be their exposed ends pressed against the said folded connecting band $f^5$. In order to allow this endwise movement of the cigarettes, immediately after the double plunger $j$ has pressed them and their wrapper into the two adjacent molds, and before it makes its return upward stroke, the said plunger is raised to a slight extent only (by means of its actuating cam 45) so as to relieve the cigarettes from downward pressure and permit them to be moved endwise and held by the end pressure of the wiper plates 63, which end pressure is maintained as the said wiper plates follow the movement of the mold wheels $i$ during their next partial rotation which will bring the cigarettes into the position in which the flaps $f^{12}$, $f^{13}$ will be folded. The folding device for effecting this fold and the wiper plates 63 are shown clearly in Figs. 8, 9 and 10 in which it will be seen that each folder proper consists of a thin spring plate 111 attached to a plate 112 which slides in suitable guideways upon the bracket 113 mounted upon the upper part of the arm 65. Underneath the plate 112 is a bowl 114 which engages with the forked outer end of the upper arm 105 of the beforementioned bell crank lever which latter is pin-jointed at 118 to the tail 117 of the wiper plate 63, which tail in its turn is pin-jointed at 108 to the arm 65.
When the arm 106 is first raised it causes the wiper plate 63 with its tail 117 to turn upon the center 108 and thereby bring the said wiper plate into engagement with the ball 62 as hereinbefore described, the bell crank lever 105, 106 being prevented from turning on its center 118 by the resistance offered to its movements by the pressure of the blade spring 107 upon the part 115. The further upward movement of the arm 106 however overcomes the resistance of the spring 107, turns the bell crank lever upon its center 118, and by the action of the fork 116 upon the bowl 114 moves the sliding plate 112 forward with its spring folder plate 111.

Each plate 111 engages with the end flaps $f^{12}$, $f^{13}$, respectively of the paper wrapper and folds it over onto the top of the cigarettes with a forward and downward movement, the latter being caused by the curved leading part 115 being forced under the roller 119 which is rotatably mounted upon an extension of the bracket 113. The mold wheels $i$ then make a further partial rotation during which the wiper plates 63 and the spring folder plates 111 continue in action. But during this partial rotation of the mold wheel the long side flaps $f^{14}$, $f^{15}$, of the wrapper are folded down and overlap slightly the already folded short end flaps $f^{12}$, $f^{13}$ as shown clearly in Figs. 14 and 21, and the spring folder plates 111 are then retired by the action of the roller 109 and cam 110, the wiper plates still pressing endwise on the cigarettes. This folding of the long side flaps $f^{14}$, $f^{15}$ is effected by means of the folders 120 which are pivotally mounted at 121 in recesses 122 in the mold wheels, being normally held in the retired or inoperative position by means of the springs 123 acting upon the arms 124. These arms 124 are furnished at their ends with bowls or rollers 125 which come into engagement with fixed cams 126 (Figs. 3 and 6) which cause the folders 120 to engage with and fold down the flaps $f^{14}$, $f^{15}$ on to the flaps $f^{12}$, $f^{13}$ respectively as hereinbefore described. During a further partial rotation of the mold wheels the wide front flaps $f^3$, $f^4$ of the paper wrapper engage with a stationary folder blade 127 which folds them over with their gummed surfaces on to the previously folded narrow flaps $f^{12}$, $f^{13}$ and $f^{14}$, $f^{15}$ and this last mentioned partial rotation which completes one quarter of a revolution of the mold wheel brings the now closed packets opposite to a horizontal channel or guideway into the mouth of which the completed twin packet is ejected from the mold, standing upon one of its long edges or sides. The ejection of the completed twin packet is effected by the upper end of the arm 128 of the bell crank lever 128, 129 acting upon the guiding rod 54 of the false bottom of the mold and pushing it out to its original position. The said bell crank lever is pivoted to the frame $m$ at 130 and receives its motion through its short arm 129 from the cam 131 upon the shaft $n$. Immediately the twin packet has entered the said channel or guideway it is prevented from falling back again by thin fingers 132 and 133 which are mounted at the ends of levers 134 and 135 pivoted respectively at 136 and 137. The lever 134 has an arm 138 which extends downwardly and is connected to one end of a forked lever 139 the fork 140 of which passes over the shaft $n$ and has a bowl 142 thereon which engages with the cam 143 on the said shaft. The other lever 135 is operated by a pin 144 upon the lever 134 which engages with the forked end of a short lever 145 pivoted at 146 the other forked end of which engages with a pin 147 upon the lever 135 whereby the fingers 132 are caused to rise when the fingers 133 descend and vice versa. When the next completed packet is ready to be ejected from its mold the fingers 132, 133 retire and allow the said packet to be pushed out of the mold into the channel or guideway pressing the first completed packet before it, and the fingers 132, 133 then return behind the packet and retain it in the channel or guideway until the next packet is ready to be ejected, and so on.

The channel or guideway has slots on either side of its fixed bottom through which pass the yokes 148, 149 which are mounted on rods 150 and 151 and loosely carry movable inner sides 152 of the channel or guideway which intermittently grip and feed the packets along the same. These movable inner sides 152 have pins 153 attached thereto, which pins pass freely through slotted holes in the yokes 148, 149 and in the fixed sides

154 of the channel or trough, and carry springs which tend to retain the movable inner sides 152 against the yokes 148, 149, but the said sides are intermittently pressed inward against the edges of the packets by means of rollers 155 mounted on the rocking levers 156 fulcrumed to brackets 157 and having intermittent motion imparted to them by the rods 158, the bell crank levers 159 fulcrumed at 160 to the brackets 161, and the bowls 162 which engage with cams 163 on the shaft $n$. The yokes 148, 149 are connected by their stems 150, 151 to the forked rods 166 which are guided in bearings 167, the fork passing over the shaft $n$ and carrying a bowl 168 which by engagement with the cam 169 on the said shaft imparts the necessary endwise motion to the movable inner sides 152 of the channel or trough. 170 is a weight which rests upon the upper edges of the packets. By the above described devices it will be seen that all the packets in the channel or trough are intermittently grasped by the movable inner side plates 152 and moved a short distance along toward the discharge end of the channel or trough, are then released, and the movable inner sides returned to their first position in readiness for a second feeding movement to make room for the entry of another completed packet into the channel or trough in which they are thereby retained until their gummed flaps are dry or set and from which they are finally discharged on to a packing table or otherwise as may be required.

Claims.

1. A machine for packing cigarettes into two united open-ended pockets forming twin packets comprising means for feeding the gummed paper wrapper into position, means for conveying the duplicate charge of cigarettes onto the wrapper, a rotating duplicate mold wheel with a circumferential wire between the molds, means for depositing the duplicate charges of cigarettes and wrappers in adjacent molds thereof, means for folding the wrapper on the cigarettes, a guideway, means for expelling the twin packet from the molds into the guideway, means for intermittently feeding the packets along said guideway until the gum has set and for finally expelling them therefrom.

2. A machine for packing cigarettes into twin packets comprising mold wheels with twin molds, a circumferential wire 49 between the molds of each pair, a movable bottom in each mold, a supporting and guiding rod for each bottom, a movable end for each mold, guiding pins for said ends, springs for holding the ends in normal position, a pin connected to each end, wiper plates engaging said pins for moving the ends inwardly, side flap holders, means for operating the same, and means for intermittently rotating the mold wheels.

3. A machine for packing cigarettes into twin packets comprising mold wheels with molds thereon, movable ends for the molds, wiper plates for actuating said ends, end flap folding devices comprising a spring folder plate, a sliding plate carrying the same, said plate being carried by the wiper plate, a rotary sleeve, an arm connecting the wiper plate to said sleeve, said wiper plate having a tail piece pivoted to the arm, a bell crank lever pivoted to the tail piece, one end of the lever engaging with the sliding plate, a curved piece 115 on the folder plate, a spring engaging with one end of the piece 115, a bowl 119 adapted to engage with the said piece 115, means engaging with the other arm of the bell crank lever to rock the same, and means for imparting oscillatory motion to the arm 65.

In testimony whereof I have signed my name to this specification in the presence of two subscribing witnesses.

EDWARD LEROY BRACY.

Witnesses:
LUTHER J. PAU,
CHAS. N. DANIELS.